US012593860B2

(12) United States Patent

Tomaru et al.

(10) Patent No.: US 12,593,860 B2

(45) Date of Patent: Apr. 7, 2026

(54) HIGH INTENSITY SWEETENER-CONTAINING BEVERAGE

(71) Applicants: ASAHI SOFT DRINKS CO., LTD., Tokyo (JP); ASAHI GROUP HOLDINGS, LTD., Tokyo (JP)

(72) Inventors: Risa Tomaru, Moriya (JP); Ryo Ito, Moriya (JP); Tomoko Ishibiki, Moriya (JP); Tetsuhiko Takemura, Moriya (JP)

(73) Assignees: ASAHI SOFT DRINKS CO., LTD. (JP); ASAHI GROUP HOLDINGS, LTD. (JP)

( * ) Notice: Subject to any disclaimer, the term of this patent is extended or adjusted under 35 U.S.C. 154(b) by 267 days.

(21) Appl. No.: 18/549,943

(22) PCT Filed: Sep. 24, 2021

(86) PCT No.: PCT/JP2021/034964

§ 371 (c)(1),
(2) Date: Sep. 11, 2023

(87) PCT Pub. No.: WO2022/208937

PCT Pub. Date: Oct. 6, 2022

(65) Prior Publication Data

US 2024/0156141 A1 May 16, 2024

(30) Foreign Application Priority Data

Mar. 30, 2021 (JP) ................................. 2021-056752

(51) Int. Cl.
*A23L 27/00* (2016.01)
*A23L 2/56* (2006.01)
*A23L 2/60* (2006.01)

(52) U.S. Cl.
CPC .................. *A23L 27/88* (2016.08); *A23L 2/56* (2013.01); *A23L 2/60* (2013.01); *A23L 27/84* (2016.08); *A23L 27/86* (2016.08)

(58) Field of Classification Search
CPC ... A23L 2/60; A23L 2/56; A23L 27/86; A23L 27/84; A23L 27/88
See application file for complete search history.

(56) References Cited

FOREIGN PATENT DOCUMENTS

| | | | | |
|---|---|---|---|---|
| JP | 2006223104 A | * | 8/2006 | ............. A23L 27/86 |
| JP | 2008-295370 A | | 12/2008 | |
| JP | 2011-045305 A | | 3/2011 | |
| JP | 2016-127855 A | | 7/2016 | |
| JP | 2016-136882 A | | 8/2016 | |
| JP | 2017-023017 A | | 2/2017 | |
| JP | 2018-130086 A | | 8/2018 | |
| JP | 2020-028244 A | | 2/2020 | |
| WO | 2018-150729 A1 | | 9/2018 | |

OTHER PUBLICATIONS

JP 2006223104 A Abstract and Description English translation (Year: 2006).*
International Search Report mailed Nov. 9, 2021 for PCT/JP2021/034964.

* cited by examiner

*Primary Examiner* — Vera Stulii
(74) *Attorney, Agent, or Firm* — Fox Rothschild LLP

(57) ABSTRACT

The high intensity sweetener-containing beverage of the present invention has a methyl anthranilate concentration of 0.01 to 40 ppm and/or an α-phenylethyl alcohol concentration of 0.01 to 40 ppm.

7 Claims, No Drawings

HIGH INTENSITY SWEETENER-CONTAINING BEVERAGE

This application is a national stage application under 35 U.S.C. § 371 of International Application No. PCT/JP2021/034964 filed Sep. 24, 2021, which claims the benefit of priority to Japanese Patent Application No. 2021-056752 filed Mar. 30, 2021, the disclosures of all of which are hereby incorporated by reference in their entireties.

TECHNICAL FIELD

The present invention relates to a high intensity sweetener-containing beverage. More specifically, the present invention relates to a high intensity sweetener-containing beverage, a method for manufacturing a high intensity sweetener-containing beverage, and a method for improving an aftertaste of a high intensity sweetener-containing beverage.

BACKGROUND ART

High intensity sweeteners are known as sweeteners having a sweetness level several hundred to several thousand times greater than sucrose. High intensity sweeteners are widely used in beverages due to being low in calories and thus appealing to health-conscious consumers and the like. However, in a case where high intensity sweeteners are used as sweeteners, in comparison with sucrose, there is a tendency for a residual sweetness, an unpleasant aftertaste, or the like to be felt. Therefore, research and development has been conducted to improve the quality and taste of beverages using high intensity sweeteners. For example, Patent Document 1 discloses a method for improving the body and residual taste of a high intensity sweetener-containing beverage by including both an acidity-imparting substance and a bitter taste-imparting substance.

Additionally, attempts have been made to use specific aromatic ingredients from the viewpoint of improving the flavor and taste of beverages. For example, Patent Document 2 discloses a flavor enhancer that uses aromatic ingredients such as phenethyl alcohol as active ingredients to impart or enhance a mellow taste in food and beverages. In addition, Patent Document 3 relates to a sweetening agent that is more natural and does not impair the palatability of food and beverages and indicates that an aromatic ingredient such as methyl anthranilate is used as an active ingredient.

RELATED DOCUMENTS

Patent Documents

[Patent Document 1] Japanese Unexamined Patent Application Publication No. 2016-127855
[Patent Document 2] Japanese Unexamined Patent Application Publication No. 2020-028244
[Patent Document 3] Japanese Unexamined Patent Application Publication No. 2018-130086

SUMMARY OF THE INVENTION

Technical Problem

The inventors carried out research focusing on how to improve a good sucrose-like sweetness and a good aftertaste in high intensity sweetener-containing beverages and found for the first time that the use of at least one of methyl anthranilate or α-phenylethyl alcohol is effective.

Solution to Problem

According to the present invention, there is provided a high intensity sweetener-containing beverage including methyl anthranilate having a concentration of 0.01 to 40 ppm and/or α-phenylethyl alcohol having a concentration of 0.01 to 40 ppm.

In addition, according to the present invention, there is provided a method for manufacturing a high intensity sweetener-containing beverage including a step for blending a high intensity sweetener, and a step for carrying out preparation such that methyl anthranilate has a concentration of 0.01 to 40 ppm, and/or α-phenylethyl alcohol has a concentration of 0.01 to 40 ppm.

In addition, according to the present invention, there is provided a method for improving an aftertaste of a high intensity sweetener-containing beverage including a step for blending a high intensity sweetener, and a step for carrying out preparation such that methyl anthranilate has a concentration of 0.01 to 40 ppm, and/or α-phenylethyl alcohol has a concentration of 0.01 to 40 ppm.

Advantageous Effects of Invention

According to the present invention, it is possible to provide a technique for improving the balance between a good sucrose-like sweetness and a good aftertaste in a high intensity sweetener-containing beverage.

DESCRIPTION OF EMBODIMENTS

A detailed description will be given below of embodiments of the present invention. In the present specification, the notation "a to b" in the description of numerical ranges indicates "a or more and b or less", unless otherwise specified.

In the present specification, "sweetness level" is a parameter indicating the intensity of sweetness of each sweetener when compared to sucrose and for which it is possible to adopt the values described in, for example, "Comprehensive List of Sweeteners" (published by the Japan Sugar Refiners' Association, May 1990), "All About High Intensity Sweetener Sucralose" (published by Korin Corporation, May 2003), "Dictionary of Beverage Terms" (published by Beverage Japan, Inc., on Jun. 25, 1999), and the like. In a case where there is a range of sweetness level values listed, the median value is to be adopted. For example, for typical sweeteners, the sweetness level is: sucrose 1, glucose 0.65, fructose 1.5, sucralose 600, acesulfame potassium 200, and aspartame 200.

In addition, it is possible to calculate the sweetness level of the beverage on the basis of the sweetness level of the sweetening ingredients indicated on the ingredient label on the container of the container-sealed beverage and the content of the sweetening ingredients identified by analysis or the like. In a case where calculation is not possible by the method described above, it is also possible to have a trained taste sensory panelist carry out a sensory evaluation using a sweetened standard aqueous solution to identify the concentration of a sucrose solution that has a sweetness equivalent to that of the beverage and use that concentration as the sweetness level.

3

<High Intensity Sweetener-Containing Beverage>

The high intensity sweetener-containing beverage (also referred to below as "beverage") of the present embodiment has a methyl anthranilate concentration of 0.01 to 40 ppm and/or an α-phenylethyl alcohol concentration of 0.01 to 40 ppm. That is, the high intensity sweetener-containing beverage of the present embodiment contains at least one of 0.01 to 40 ppm of methyl anthranilate and 0.01 to 40 ppm of α-phenylethyl alcohol, or may have a combination thereof.

Due to this, it is possible for the high intensity sweetener-containing beverage of the present embodiment to reduce the unpleasantness of the aftertaste derived from high intensity sweeteners after drinking the beverage and to improve the good sucrose-like sweetness while obtaining a good sucrose-like aftertaste. Although the details of the reason for the above are not clear, it is assumed that, among the aromatic ingredients, the sweet aroma characteristic of methyl anthranilate and the floral aroma characteristic of α-phenylethyl alcohol make it possible to deepen the sweetness while effectively masking the unpleasant sweetness characteristic of high intensity sweeteners. As a result, it is considered that it is possible to obtain a good balance between a good sucrose-like sweetness and a good aftertaste.

In addition, according to the beverage of the present embodiment, regardless of the type of high intensity sweetener, by including at least one of 0.01 to 40 ppm of methyl anthranilate and 0.01 to 40 ppm of α-phenylethyl alcohol, it is possible to improve the balance between a good sucrose-like sweetness and a good aftertaste in a high intensity sweetener-containing beverage.

The "good sucrose-like sweetness" is intended to be a sweetness that is similar to sucrose, that is more natural and moderate, and that is less likely to leave an unpleasant feeling.

A description will be given below of each ingredient included in the high intensity sweetener-containing beverage of the present embodiment.

[High Intensity Sweetener]

In the present embodiment, a high intensity sweetener refers to a sweetener having a sweetness level several hundred to several thousand times that of sucrose.

Examples of high intensity sweeteners include licorice extract, Lakanka extract, stevia, somatin, glycyrrhizin, disodium glycyrrhizate, saccharin, sodium saccharin, aspartame, acesulfame potassium, sucralose, allotame, neotame, and mixtures thereof. Among these, one type or two or more types selected from stevia, aspartame, acesulfame potassium, and sucralose is preferable.

In addition, as the sweetening ingredients included in stevia, steviol glycosides such as stevioside, rebaudioside A, rebaudioside C, and zulkoside A are known, but the above have different sugar substitution rates and also different sweetness levels. In addition, examples of stevia standards include high-purity stevia (stevia extract) and enzyme-treated stevia (α-glucosyltransferase-treated stevia), both of which include 80% or more of steviol glycosides. In the beverage of the present embodiment, it is possible to improve the balance between a good sucrose-like sweetness and a good aftertaste regardless of the stevia sweetness level or standard.

The content of the high intensity sweetener is not particularly limited and is preferably adjusted, as appropriate, according to the sweetness level of the beverage.

[Methyl Anthranilate]

Methyl anthranilate, also known as methyl 2-aminobenzoate or the like, is an aromatic ingredient and is included in various floral essential oils such as neroli and jasmine, peel oils such as sweet orange and mandarin, and the like. The high intensity sweetener-containing beverage of the present embodiment preferably contains 0.01 to 40 ppm of methyl anthranilate. Due to this, it is possible to obtain a good balance between a good sucrose-like sweetness and a good aftertaste.

In addition, from the viewpoint of improving the balance between a good sucrose-like sweetness and a good aftertaste while suppressing miscellaneous tastes and bitterness, 0.05 ppm or more is preferable, 0.2 ppm or more is more preferable, and 0.5 ppm or more is even more preferable. On the other hand, from the viewpoint of maintaining the deliciousness and the effect of suppressing miscellaneous tastes and bitterness while improving the balance between a good sucrose-like sweetness and a good aftertaste, 30 ppm or less is preferable, 20 ppm or less is more preferable, 15 ppm or less is even more preferable, and 9 ppm or less is yet more preferable.

[α-phenylethyl Alcohol]

α-phenylethyl alcohol is an aromatic ingredient also called α-methylbenzyl alcohol or the like and is used in rose-like flavoring agents such as lilac and jasmine, fruity flavors, and the like. The high intensity sweetener-containing beverage of the present embodiment preferably contains 0.01 to 40 ppm of α-phenylethyl alcohol. Due to this, it is possible to obtain a good balance between a good sucrose-like sweetness and a good aftertaste.

In addition, from the viewpoint of improving the balance between a good sucrose-like sweetness and a good aftertaste while suppressing miscellaneous tastes and bitterness, 0.05 ppm or more is preferable, 0.2 ppm or more is more preferable, and 0.5 ppm or more is even more preferable. On the other hand, from the viewpoint of maintaining the deliciousness and the effect of suppressing miscellaneous tastes and bitterness while improving the balance between a good sucrose-like sweetness and a good aftertaste, 30 ppm or less is preferable, 20 ppm or less is more preferable, 15 ppm or less is even more preferable, and 9 ppm or less is yet more preferable.

The high intensity sweetener-containing beverage of the present embodiment may use the methyl anthranilate and α-phenylethyl alcohol alone or in combination. In a case of being used in combination, the ratio is not particularly limited, but a concentration ratio of methyl anthranilate to α-phenylethyl alcohol of 100:1 to 1:1 is preferable and 80:1 to 1:1 is more preferable. Due to this, it is possible to obtain a good balance between a good sucrose-like sweetness and a good aftertaste and also to improve the deliciousness.

In the present embodiment, it is possible to adjust the concentration of the methyl anthranilate and α-phenylethyl alcohol described above by adding flavoring agents, extracts or the like in a range in which the effect of the present invention is not impaired.

In addition, it is possible to measure the concentration of each of the methyl anthranilate and α-phenylethyl alcohol included in the high intensity sweetener-containing beverage of the present embodiment by GC/MS analysis (gas chromatography mass spectrometry).

[Other Ingredients]

The beverage of the present embodiment may include ingredients other than those listed above as long as the effects of the present invention are achieved. Specifically, it is possible to contain ingredients normally blended into beverages, such as sweeteners other than high intensity sweeteners, fruit juices, acidifiers, milk, flavoring agents, vitamins, colorings, salt, minerals, antioxidants, emulsifiers, preservatives, seasonings, extracts, pH adjusters, quality stabilizers, and thickening agents.

Examples of the fruit juices described above include grape juice, orange juice, tangerine juice, mandarin juice, grapefruit juice, lemon juice, lime juice, apple juice, peach juice, strawberry juice, banana juice, pineapple juice, mango juice, and the like. The above may be used as one type alone or two or more types may be used in combination.

Fruit juice refers to liquid ingredients obtained by crushing fruits or edible plants to carry out squeezing, straining, or the like and to liquid ingredients made transparent by carrying out an enzymatic treatment or the like on the above. The fruit juice percentage (in terms of straight fruit juice) of the beverage of the present embodiment is not particularly limited and is adjusted, as appropriate, according to palatability, but, for example, is preferably 1 to 50% by mass and more preferably 1 to 30% by mass.

Examples of the sweeteners described above include sugars such as fructose, sucrose, glucose, granulated sugar, lactose, and maltose, low-sweetness level sweeteners such as xylitol and D-sorbitol, and the like. The above may be used alone as one type or in a combination of two or more types.

However, from the viewpoint of obtaining a more pronounced aftertaste improvement effect in the high intensity sweetener-containing beverage of the present embodiment, it is preferable for no sweetener other than the high intensity sweetener to be included.

Examples of the acidifiers described above include citric acid, adipic acid, gluconic acid, succinic acid, tartaric acid, lactic acid, fumaric acid, malic acid, acetic acid, phytic acid, ascorbic acid, phosphoric acid, salts thereof, and the like.

The milk described above may be any milk derived from animals or plants. For example, it is possible to use animal milk such as cow's milk, goat's milk, sheep's milk, and horse's milk, as well as plant milk such as soybean milk, among which cow's milk is the most common. It is possible to use these milks alone or as a mixture of two or more types. In addition, it is also possible to use these milks as fermented milk, which is fermented using microorganisms such as lactic acid bacteria or bifidobacteria.

The form of the milk is not particularly limited and examples thereof include full-fat milk, skimmed milk, whey, and milk protein concentrate and it is also possible to use milk reduced from powdered or concentrated milk.

In the case of beverages including milk, the milk content is not particularly limited, but from the viewpoint of improving the good sucrose-like sweetness and the good aftertaste while obtaining a favorable milk taste, the milk solids content is preferably 0.1 to 3.0% by mass and the milk solids content is more preferably 0.5 to 2.5% by mass. The milk solids content means the sum of milk fat content and Solids Non-Fat (SNF) of milk.

[Sugar Content (Brix Value)]

It is possible to set the sugar content (Brix value) of the beverage (20° C.) of the present embodiment as appropriate according to the palatability of the beverage, for example, a sugar content of 1 to 20° is preferable and a sugar content of 1 to 10° is more preferable.

It is possible to measure the sugar content (Brix value), for example, by using a digital refractometer Rx-5000a (manufactured by Atago Co., Ltd.) to measure the indication of the refractometer for sugar at 20° C.

It is possible to adjust the sugar content, for example, according to the content of sweeteners such as the high intensity sweetener, fruit juice, and various other ingredients described above.

[Acidity]

The acidity of the beverage of the present embodiment is preferably 0.1 g/100 ml or more and 0.5 g/100 ml or less. By setting the acidity to the lower limit value described above or more, it is possible to obtain deliciousness. On the other hand, by setting the acidity to the upper limit value described above or less, it is possible to achieve both of the suppression of excessive acidity and deliciousness.

It is possible to express acidity in grams (anhydrous citric acid g/100 ml) in a case where the amount of acid included in 100 ml is converted to citric acid. In addition, it is also possible to measure acidity by the method specified in the JAS standard acidity measurement method, specifically, the neutralization titration method (quantitative method) using a 0.1 mol/L sodium hydroxide standard solution as an alkaline solution.

[pH]

The pH of the beverage of the present embodiment at 20° C. is preferably 2.8 to 4.5, more preferably 3.1 to 4.2, and even more preferably 3.3 to 4.0. This makes it possible to favorably maintain the deliciousness.

It is possible to carry out the pH measurement by using a commercially available pH measuring device or the like. It is possible to adjust the pH, for example, by changing the amount of a specific acid, by using a pH adjuster, or the like.

[Carbon Dioxide Gas, Alcohol]

In addition, the beverage of the present embodiment may also be a carbonated beverage containing carbon dioxide gas. The method by which the beverage is made to contain the carbon dioxide gas is not particularly limited and is able to be set by a person skilled in the art as appropriate.

In addition, the beverage of the present embodiment is preferably a non-alcoholic beverage. A non-alcoholic beverage refers to a beverage that contains substantially no alcohol, specifically, a beverage in which the content of alcohol such as ethanol is less than 1.0 volume/volume %.

[Container]

Examples of the container used for the beverage of the present embodiment include a sealed container formed of single materials such as glass, paper, plastic (such as polyethylene terephthalate), aluminum, and steel or of composite materials or laminated materials of the above. In addition, the types of containers are not particularly limited, but examples thereof include plastic bottles, aluminum cans, steel cans, paper cartons, chilled cups, bottles, and the like.

The capacity of the beverage is not particularly limited, but 100 to 2000 g is preferable, and 100 to 500 g is more preferable in terms of ease of being able to finish drinking the beverage.

The method for carrying out a heat sterilization treatment on the container-sealed beverage is not particularly limited, but, in Japan, beverages are subjected to a heat sterilization treatment in accordance with the provisions of the Food Sanitation Law. Specifically, examples thereof include a method in which a short-time sterilization is carried out at a high temperature followed by filling into a storage container subjected to a sterilization treatment under aseptic conditions (UHT sterilization method), and a retort sterilization method in which a prepared liquid is filled into a can or other storage container and then subjected to a retort treatment.

[Method for Manufacturing High Intensity Sweetener-Containing Beverage]

The method for manufacturing a high intensity sweetener-containing beverage of the present embodiment includes a step for blending the high intensity sweetener and a step for carrying out preparation such that methyl anthranilate has a concentration of 0.01 to 40 ppm, and/or α-phenylethyl alcohol has a concentration of 0.01 to 40 ppm.

Due to this, it is possible to obtain a high intensity sweetener-containing beverage which is able to improve the balance between a good sucrose-like sweetness and a good aftertaste.

In addition, the order of the step for blending the high intensity sweetener and the step for carrying out preparation of the concentration of each aromatic ingredient described above is not particularly limited and each step may be performed simultaneously.

Each ingredient included in the high intensity sweetener, the physical properties, and the like are the same as in the beverages described above.

[Method for Improving Aftertaste of High Intensity Sweetener-Containing Beverage]

This method for improving an aftertaste of a high intensity sweetener-containing beverage of the present embodiment includes a step for blending the high intensity sweetener and a step for carrying out preparation such that methyl anthranilate has a concentration of 0.01 to 40 ppm, and/or α-phenylethyl alcohol has a concentration of 0.01 to 40 ppm.

Due to this, it is possible to obtain a high intensity sweetener-containing beverage which is able to improve the balance between a good sucrose-like sweetness and a good aftertaste.

In addition, the order of the step for blending the high intensity sweetener and the step for preparing the concentration of each aromatic ingredient described above is not particularly limited and each step may be performed simultaneously.

Each ingredient included in the high intensity sweetener, the physical properties, and the like are the same as in the beverages described above.

Embodiments of the present invention were described above; however, these embodiments are examples of the present invention and it is also possible to adopt various configurations other than the foregoing.

EXAMPLES

A description will be given below of the present invention by means of Examples and Comparative Examples, but the present invention is not limited thereto.

Unless otherwise noted, "%" represents "% by mass".

(1) Determination of Aromatic Ingredients in Beverages

The concentration (ppb or ppm) of methyl anthranilate and α-phenylethyl alcohol in beverages was measured as follows.

10 ml of each beverage to be analyzed was placed in 20 ml capacity vials, which were then tightly closed. The above were introduced into a GC/MS (manufactured by Agilent Technologies, Inc.) by the DHS (dynamic head space) method using MPS manufactured by Gerstel Inc.

Calibration curves were created by the standard addition method and cyclohexanol was used as the internal standard.

[Analytical Conditions for GC/MS]

GC: 7890B manufactured by Agilent Technologies, Inc.
MS: 5977B manufactured by Agilent Technologies, Inc.
Collection tube (adsorbent): Tenax TA
Column: DB-WAX UI manufactured by Agilent Technologies, Inc., 30 m×0.25 mm, film thickness 0.25 μm.

Injection method: Splitless.

Carrier gas: He.

Inlet temperature: 240° C.

Transfer line: 240° C.

Oven temperature: 40° C. (2 min) 8° C./min 230° C. (5 min).

MS conditions: SIM mode

Quantitative ions: methyl anthranilate m/z 151, α-phenylethyl alcohol m/z 107, cyclohexanol (internal standard) m/z 57.

(2) Sensory Evaluation of Beverages

Sensory testing was carried out on the beverages by five trained panelists.

Specifically, each panelist tasted the beverage (20° C.) and, in accordance with the following evaluation criteria, evaluated the "good sweetness quality", "good aftertaste", "intensity of bitterness", "intensity of miscellaneous tastes", and "deliciousness" felt at the time of tasting using seven stages, with four points for the control, and calculated the average value thereof.

Evaluation Criteria: "Good Sweetness Quality", "Good Aftertaste", "Intensity of Bitterness", and "Intensity of Miscellaneous Tastes".

Grade 7: Very strong (good) compared to the control

Grade 6: Strong (good) compared to the control

Grade 5: Somewhat strong (good) compared to the control

Grade 4: Not much different to the control

Grade 3: Somewhat weak (not good) compared to the control

Grade 2: Weak (not good) compared to the control

Grade 1: Extremely weak (not good) compared to the control

Evaluation Criteria "Deliciousness"

Grade 7: Very well-balanced flavors, favorable taste

Grade 6: Well-balanced flavors, favorable taste

Grade 5: Somewhat well-balanced flavor, favorable taste

Grade 4: Not much different to the control

Grade 3: Somewhat unbalanced flavor, not a favorable taste

Grade 2: Unbalanced flavor, not a favorable taste

Grade 1: Very unbalanced flavor, not a favorable taste (3) Preparation of Base Liquids A to F The raw materials shown in Table 1 were mixed to obtain base liquids A to F having different types of high intensity sweetener. In addition, included in each base liquid were 0.10 ppb of α-phenylethyl alcohol and 1.1 ppb of methyl anthranilate.

Each obtained base liquid was sterilized by instant sterilization at 95° C. and sealed in a container.

In the following test examples, the aromatic ingredients were added and all dissolved in the beverage after the container was opened and sensory evaluation was performed immediately thereafter.

TABLE 1

| Raw materials | | Base liquid A | Base liquid B | Base liquid C | Base liquid D | Base liquid E | Base liquid F |
|---|---|---|---|---|---|---|---|
| High intensity sweetener (g/L) | Rebaudio GRA-90P (enzyme-treated stevia) | 0.270 | | | | | 0.280 |
| | Rebaudio J-100 (stevia extract) | | 0.148 | | | | |
| | Rebaudio A9-90 (stevia extract) | | | 0.270 | | | |
| | Aspartame | | | | 0.213 | | |
| | Acesulfame K | | | | | 0.213 | |
| Other (g/L) | Skimmed milk powder | 6 | ← | ← | ← | ← | 0 |
| | Soybean polysaccharides | 1.5 | ← | ← | ← | ← | ← |
| | Lactic acid | 2.5 | ← | ← | ← | ← | ← |
| | White grape transparent juice (Bx: 68°) | 33 | ← | ← | ← | ← | ← |
| | Trisodium citrate | 0.9 | ← | ← | ← | ← | 2.5 |
| Physical properties (20° C.) | Brix | 3.30 | ← | ← | ← | ← | 2.60 |
| | pH | 3.65 | ← | ← | ← | ← | 3.65 |
| | Acid | 0.21 | ← | ← | ← | ← | 0.20 |
| | Sweetness level | 8.5 | ← | ← | ← | ← | ← |

(4) Test Example 1: Comparison of Aromatic Ingredients

Using the base liquid A, each beverage was prepared by blending α-phenylethyl alcohol, methyl anthranilate, styralyl acetate, and phenylethyl butyrate to have the concentrations shown in Tables 2 and 3 and the measuring as described in (1) above and the sensory evaluation in (2) described above were performed on each obtained beverage. The control was the base liquid A. The results are shown in Tables 2 and 3.

TABLE 2

| | Base liquid A | Example 1 | Example 2 | Example 3 | Example 4 | Example 5 | Comparative Example 1 | Example 6 | Example 7 | Example 8 | Example 9 | Example 10 | Comparative Example 2 |
|---|---|---|---|---|---|---|---|---|---|---|---|---|---|
| α-phenylethyl alcohol | | 0.01 ppm | 0.1 ppm | 1 ppm | 5 ppm | 10 ppm | 50 ppm | — | — | — | — | — | — |
| Methyl anthranilate | | — | — | — | — | — | — | 0.01 ppm | 0.1 ppm | 1 ppm | 5 ppm | 10 ppm | 50 ppm |
| 1 Good sweetness | 4 | 4.4 | 4.6 | 5.0 | 5.2 | 4.8 | 3.6 | 4.2 | 4.6 | 5.0 | 4.6 | 4.4 | 3.2 |
| 2 Good aftertaste | 4 | 4.2 | 4.2 | 5.0 | 5.2 | 4.8 | 3.4 | 4.4 | 5.0 | 5.4 | 4.8 | 4.6 | 3.4 |
| 3 Bitterness | 4 | 4.0 | 4.0 | 4.0 | 3.8 | 3.8 | 3.8 | 4.0 | 3.6 | 3.6 | 3.6 | 3.6 | 3.4 |
| 4 Miscellaneous tastes | 4 | 4.0 | 3.8 | 3.2 | 2.6 | 2.8 | 3.6 | 3.8 | 2.8 | 2.2 | 2.4 | 2.8 | 3.6 |
| 5 Deliciousness | 4 | 4.0 | 4.0 | 5.0 | 5.0 | 4.8 | 3.2 | 4.2 | 5.2 | 5.8 | 4.6 | 4.4 | 2.8 |

TABLE 3

| | Base liquid A | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|---|---|
| Styralyl acetate | | 0.01 ppm | 0.1 ppm | 1 ppm | 5 ppm | 10 ppm | 50 ppm | — | — | — | — | — | — |
| Phenylethyl butyrate | | — | — | — | — | — | — | 0.01 ppm | 0.1 ppm | 1 ppm | 5 ppm | 10 ppm | 50 ppm |
| 1 Good sweetness | 4 | 4.0 | 4.0 | 3.8 | 3.6 | 3.2 | 2.6 | 4.0 | 3.8 | 3.8 | 3.6 | 3.4 | 2.8 |

TABLE 3-continued

| | Base liquid A | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|---|---|---|---|
| 2 Good aftertaste | 4 | 4.0 | 3.8 | 3.4 | 3.0 | 2.6 | 1.6 | 4.0 | 3.8 | 3.0 | 2.8 | 2.6 | 2.0 |
| 3 Bitterness | 4 | 4.0 | 4.0 | 4.2 | 4.2 | 4.4 | 4.6 | 4.0 | 4.4 | 4.6 | 4.2 | 4.8 | 5.0 |
| 4 Miscellaneous tastes | 4 | 4.0 | 4.2 | 4.6 | 4.8 | 4.8 | 5.4 | 4.0 | 4.2 | 4.4 | 4.6 | 4.8 | 4.8 |
| 5 Deliciousness | 4 | 4.0 | 4.0 | 3.2 | 2.8 | 2.4 | 1.4 | 4.0 | 4.0 | 3.0 | 3.0 | 2.8 | 2.2 |

(5) Test Example 2: Combined Use of Aromatic Ingredients

Beverages were prepared by adding α-phenylethyl alcohol and methyl anthranilate to the base liquid A to have the concentrations shown in Table 4.

The measuring as in (1) described above and the sensory evaluation in (2) described above were performed on the obtained beverages. The control was the base liquid A. The results are shown in Table 4.

TABLE 4

| | Base liquid A | Example 11 |
|---|---|---|
| α-phenylethyl alcohol | | 1 ppm |
| Methyl anthranilate | | 1 ppm |
| 1 Good sweetness | 4 | 5.0 |
| 2 Good aftertaste | 4 | 5.0 |

TABLE 4-continued

| | Base liquid A | Example 11 |
|---|---|---|
| 3 Bitterness | 4 | 3.4 |
| 4 Miscellaneous tastes | 4 | 3.6 |
| 5 Deliciousness | 4 | 5.2 |

(6) Test Example 3: Change of Base Liquid (Change of Stevia Type)

Using the base liquid B, each beverage was prepared by blending α-phenylethyl alcohol, methyl anthranilate, styralyl acetate, and phenylethyl butyrate to have the concentrations shown in Tables 5 and 6 and the measuring as in (1) described above and the sensory evaluation in (2) described above were performed on the obtained beverages. The control was the base liquid B. The results are shown in Tables 5 and 6.

TABLE 5

| | Base liquid B | Example 12 | Example 13 | Example 14 | Example 15 | Example 16 | Comparative Example 15 | Example 17 | Example 18 | Example 19 | Example 20 | Example 21 | Comparative Example 16 |
|---|---|---|---|---|---|---|---|---|---|---|---|---|---|
| α-phenyl ethyl alcohol | | 0.01 ppm | 0.1 ppm | 1 ppm | 5 ppm | 10 ppm | 50 ppm | — | — | — | — | — | — |
| Methyl anthranilate | | — | — | — | — | — | — | 0.01 ppm | 0.1 ppm | 1 ppm | 5 ppm | 10 ppm | 50 ppm |
| 1 Good sweetness | 4 | 4.4 | 4.6 | 5.0 | 5.0 | 4.8 | 3.8 | 4.2 | 4.4 | 5.2 | 5.2 | 4.8 | 3.8 |
| 2 Good aftertaste | 4 | 4.2 | 4.2 | 5.0 | 5.4 | 5.2 | 3.8 | 4.4 | 4.6 | 4.8 | 5.2 | 5.0 | 4.0 |
| 3 Bitterness | 4 | 4.0 | 4.0 | 4.0 | 3.8 | 3.6 | 4.0 | 4.0 | 3.8 | 4.0 | 3.6 | 3.2 | 3.2 |
| 4 Miscellaneous tastes | 4 | 4.0 | 3.8 | 3.2 | 3.0 | 3.6 | 4.4 | 3.8 | 3.4 | 2.8 | 2.8 | 2.8 | 3.4 |
| 5 Deliciousness | 4 | 4.0 | 4.2 | 4.8 | 5.2 | 4.8 | 3.0 | 4.2 | 4.6 | 5.2 | 5.4 | 5.2 | 3.4 |

TABLE 6

| | Base liquid B | Comparative Example 17 | Comparative Example 18 | Comparative Example 19 | Comparative Example 20 | Comparative Example 21 | Comparative Example 22 | Comparative Example 23 | Comparative Example 24 | Comparative Example 25 | Comparative Example 26 | Comparative Example 27 | Comparative Example 28 |
|---|---|---|---|---|---|---|---|---|---|---|---|---|---|
| Styralyl acetate | | 0.01 ppm | 0.1 ppm | 1 ppm | 5 ppm | 10 ppm | 50 ppm | — | — | — | — | — | — |
| Phenyl-ethyl butyrate | | — | — | — | — | — | — | 0.01 ppm | 0.1 ppm | 1 ppm | 5 ppm | 10 ppm | 50 ppm |
| 1 Good sweetness | 4 | 4.0 | 4.0 | 3.8 | 3.2 | 3.0 | 2.4 | 4.0 | 4.0 | 3.4 | 3.4 | 3.2 | 2.6 |
| 2 Good aftertaste | 4 | 3.8 | 3.8 | 3.6 | 3.2 | 2.4 | 1.6 | 4.0 | 4.0 | 3.6 | 2.8 | 2.4 | 1.8 |
| 3 Bitterness | 4 | 4.0 | 4.0 | 4.4 | 4.4 | 4.4 | 4.6 | 4.0 | 4.0 | 4.0 | 4.0 | 4.6 | 5.0 |
| 4 Miscellaneous tastes | 4 | 4.0 | 4.2 | 4.0 | 4.4 | 5.0 | 5.4 | 4.0 | 4.2 | 4.4 | 4.6 | 4.8 | 5.4 |
| 5 Deliciousness | 4 | 4.0 | 4.0 | 3.6 | 3.0 | 2.2 | 1.6 | 4.0 | 4.0 | 3.2 | 3.0 | 2.6 | 1.8 |

(7) Test Example 4: Change of Base Liquid
(Change of Type of High Intensity Sweetener)

Using the base liquids C, D, and E, each beverage was prepared by blending α-phenylethyl alcohol, methyl anthranilate, styralyl acetate, and phenylethyl butyrate to have the concentrations shown in Table 7 and the measuring as in (1) described above and the sensory evaluation in (2) described above were performed on each obtained beverage. The controls were the base liquids C, D, and E, respectively. The results are shown in Table 7.

TABLE 7

| | Base liquid C | Example 22 | Example 23 | Comparative Example 29 | Comparative Example 30 | Base liquid D | Example 24 | Example 25 | Comparative Example 31 | Comparative Example 32 | Base liquid E | Example 26 | Example 27 | Comparative Example 33 | Comparative Example 34 |
|---|---|---|---|---|---|---|---|---|---|---|---|---|---|---|---|
| α-phenyl ethyl alcohol | | 5 ppm | | | | | 5 ppm | | | | | 5 ppm | | | |
| Methyl anthranilate | | | 5 ppm | | | | | 5 ppm | | | | | 5 ppm | | |
| Styralyl acetate | | | | 5 ppm | | | | | 5 ppm | | | | | 5 ppm | |
| Phenyl-ethyl butyrate | | | | | 5 ppm | | | | | 5 ppm | | | | | 5 ppm |
| 1 Good sweetness | 4 | 4.8 | 4.8 | 3.4 | 3.6 | 4 | 5.2 | 4.4 | 3.8 | 4.0 | 4 | 4.6 | 4.6 | 3.6 | 4.0 |
| 2 Good aftertaste | 4 | 4.8 | 5.0 | 3.2 | 3.6 | 4 | 5.0 | 5.0 | 3.8 | 3.6 | 4 | 4.8 | 4.6 | 3.6 | 4.0 |
| 3 Bitterness | 4 | 3.4 | 2.8 | 4.6 | 4.0 | 4 | 2.8 | 3.0 | 4.0 | 4.2 | 4 | 3.6 | 3.6 | 4.4 | 3.4 |
| 4 Miscellaneous tastes | 4 | 3.2 | 3.2 | 4.4 | 4.0 | 4 | 2.8 | 3.2 | 4.2 | 4.0 | 4 | 3.8 | 3.2 | 4.0 | 4.0 |

TABLE 7-continued

| | Base liquid C | Example 22 | Example 23 | Comparative Example 29 | Comparative Example 30 | Base liquid D | Example 24 | Example 25 | Comparative Example 31 | Comparative Example 32 | Base liquid E | Example 26 | Example 27 | Comparative Example 33 | Comparative Example 34 |
|---|---|---|---|---|---|---|---|---|---|---|---|---|---|---|---|
| 5 Deliciousness | 4 | 5.2 | 4.8 | 3.6 | 4.0 | 4 | 5.4 | 4.6 | 3.6 | 3.8 | 4 | 4.6 | 4.4 | 3.6 | 3.8 |

(8) Test Example 5: Change of Sweetness Level

Base liquids a to g with different sweetness levels were prepared by mixing each of the raw materials in the same manner as in the base liquid A, except that the concentration of enzyme-treated stevia was changed as shown in Tables 8 and 9. The base liquid d and the base liquid A are substantially the same.

Then, each of the beverages was prepared by blending cx-phenylethyl alcohol and methyl anthranilate to have the concentrations shown in Tables 8 and 9 and the measuring as in (1) described above and the sensory evaluation in (2) described above were performed on the obtained beverages. The controls were each of the base liquids a to g before blending each aromatic ingredient. The results are shown in Tables 8 and 9.

TABLE 8

| | Base liquid a | Example 28 | Example 29 | Base liquid b | Example 30 | Example 31 | Base liquid c | Example 32 | Example 33 | Base liquid d (Base liquid A) | Example 3 | Example 8 |
|---|---|---|---|---|---|---|---|---|---|---|---|---|
| Rebaudio GRA-90P (enzyme-treated stevia) (g/L) | 0.01 | ← | ← | 0.09 | ← | ← | 0.18 | ← | ← | 0.27 | ← | ← |
| α-phenylethyl alcohol | | 1 ppm | | | 1 ppm | | | 1 ppm | | | 1 ppm | |
| Methyl anthranilate | | | 1 ppm | | | 1 ppm | | | 1 ppm | | | 1 ppm |
| Sweetness level of beverage | | 2.5 | | | 4.5 | | | 6.5 | | | 8.5 | |
| 1 Good sweetness | 4 | 4.4 | 4.6 | 4 | 4.6 | 5.0 | 4 | 4.8 | 5.2 | 4 | 5.0 | 5.0 |
| 2 Good aftertaste | 4 | 4.6 | 5.0 | 4 | 5.0 | 4.8 | 4 | 5.0 | 4.8 | 4 | 5.0 | 5.4 |
| 3 Bitterness | 4 | 4.2 | 3.8 | 4 | 3.8 | 3.4 | 4 | 3.8 | 3.2 | 4 | 4.0 | 3.6 |
| 4 Miscellaneous tastes | 4 | 4.0 | 3.8 | 4 | 3.6 | 3.0 | 4 | 3.2 | 3.0 | 4 | 3.2 | 2.2 |
| 5 Deliciousness | 4 | 4.4 | 4.6 | 4 | 4.6 | 5.2 | 4 | 5.0 | 5.4 | 4 | 5.0 | 5.8 |

TABLE 9

| | Base liquid e | Example 34 | Example 35 | Base liquid f | Example 36 | Example 37 | Base liquid g | Example 38 | Example 39 |
|---|---|---|---|---|---|---|---|---|---|
| Rebaudio GRA-90P (enzyme-treated stevia) (g/L) | 0.36 | ← | ← | 0.45 | ← | ← | 0.54 | ← | ← |
| α-phenylethyl alcohol | | 1 ppm | | | 1 ppm | | | 1 ppm | |
| Methyl anthranilate | | | 1 ppm | | | 1 ppm | | | 1 ppm |
| Sweetness level of beverage | | 10.5 | | | 12.5 | | | 14.5 | |
| 1 Good sweetness | 4 | 5.2 | 4.8 | 4 | 4.8 | 4.2 | 4 | 4.6 | 4.2 |
| 2 Good aftertaste | 4 | 5.0 | 5.0 | 4 | 4.8 | 4.8 | 4 | 4.6 | 4.4 |
| 3 Bitterness | 4 | 3.6 | 3.6 | 4 | 3.2 | 3.4 | 4 | 3.4 | 4.2 |
| 4 Miscellaneous tastes | 4 | 3.2 | 3.4 | 4 | 3.2 | 3.6 | 4 | 3.4 | 3.4 |
| 5 Deliciousness | 4 | 5.0 | 4.8 | 4 | 5.2 | 4.6 | 4 | 4.6 | 3.8 |

(9) Test Example 6: Milk (Powdered Skimmed Milk) Non-Containing

Using the base liquid F, each beverage was prepared by blending α-phenylethyl alcohol, methyl anthranilate, styralyl acetate, and phenylethyl butyrate to have the concentrations shown in Table 10, and the obtained beverages were measured as in (1) described above and sensory evaluation as in (2) described above was performed. The control was the base liquid F. The results are shown in Table 10.

TABLE 10

| | Base liquid F | Example 40 | Example 41 | Comparative Example 36 | Comparative Example 37 |
|---|---|---|---|---|---|
| α-phenylethyl alcohol | | 5 ppm | | | |
| Methyl anthranilate | | | 5 ppm | | |
| Styralyl acetate | | | | 5 ppm | |
| Phenylethyl butyrate | | | | | 5 ppm |
| 1 Good sweetness | 4 | 4.8 | 5.0 | 3.2 | 3.2 |
| 2 Good aftertaste | 4 | 5.2 | 5.2 | 3.2 | 3.0 |
| 3 Bitterness | 4 | 3.0 | 3.0 | 4.0 | 4.8 |
| 4 Miscellaneous tastes | 4 | 3.0 | 3.0 | 4.0 | 5.0 |
| 5 Deliciousness | 4 | 5.0 | 5.2 | 3.2 | 3.0 |

This application claims priority based on Japanese Application No. 2021-056752, filed Mar. 30, 2021, the entire disclosure of which is incorporated herein.

The invention claimed is:

1. A high intensity sweetener-containing beverage comprising:
   methyl anthranilate having a concentration of 0.01 to 40 ppm and/or;
   α-phenylethyl alcohol having a concentration of 0.01 to 40 ppm.

2. The high intensity sweetener-containing beverage according to claim 1,
   wherein the high intensity sweetener is one or two or more selected from stevia, aspartame, acesulfame potassium, and sucralose.

3. The high intensity sweetener-containing beverage according to claim 1, wherein a sweetness level is 2.5 to 12.5.

4. The high intensity sweetener-containing beverage according to claim 1, further comprising: milk.

5. The high intensity sweetener-containing beverage according to claim 1, wherein the high intensity sweetener-containing beverage is sealed in a container.

6. A method for manufacturing a high intensity sweetener-containing beverage, the method comprising:
   a step for blending a high intensity sweetener; and
   a step for carrying out preparation such that methyl anthranilate has a concentration of 0.01 to 40 ppm, and/or α-phenylethyl alcohol has a concentration of 0.01 to 40 ppm.

7. A method for improving an aftertaste of a high intensity sweetener-containing beverage, the method comprising:
   a step for blending a high intensity sweetener, and
   a step for carrying out preparation such that methyl anthranilate has a concentration of 0.01 to 40 ppm, and/or α-phenylethyl alcohol has a concentration of 0.01 to 40 ppm.

* * * * *